United States Patent
Yoshimura et al.

(10) Patent No.: US 8,347,282 B2
(45) Date of Patent: Jan. 1, 2013

(54) EMBEDDED CONTROLLERS AND DEVELOPMENT TOOL FOR EMBEDDED CONTROLLERS

(75) Inventors: Kentaro Yoshimura, Hitachi (JP); Taizo Miyazaki, Hitachi (JP); Takanori Yokoyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/194,948

(22) Filed: Aug. 20, 2008

(65) Prior Publication Data

US 2008/0313614 A1  Dec. 18, 2008

Related U.S. Application Data

(62) Division of application No. 10/739,222, filed on Dec. 19, 2003, now abandoned.

(30) Foreign Application Priority Data

Dec. 20, 2002  (JP) .................................. 2002-369167

(51) Int. Cl.
 G06F 9/44 (2006.01)
 G06F 9/445 (2006.01)
(52) U.S. Cl. ......... 717/170; 717/120; 717/121; 717/175
(58) Field of Classification Search .................. None
 See application file for complete search history.

(56) References Cited

U.S. PATENT DOCUMENTS

| 6,161,071 | A | * | 12/2000 | Shuman et al. ................. 701/48 |
| 6,185,484 | B1 | * | 2/2001 | Rhinehart ......................... 701/1 |
| 6,192,331 | B1 | | 2/2001 | Gaessler et al. |
| 6,272,402 | B1 | * | 8/2001 | Kelwaski ............................ 701/1 |
| 6,429,885 | B1 | | 8/2002 | Saib et al. |
| 6,445,989 | B2 | * | 9/2002 | Nishimura et al. ............. 701/48 |
| 6,768,941 | B2 | | 7/2004 | Sasena et al. |
| 6,983,460 | B1 | * | 1/2006 | Goire et al. .................... 717/175 |
| 7,058,485 | B2 | * | 6/2006 | Thomas et al. ................... 701/1 |
| 7,117,504 | B2 | | 10/2006 | Smith et al. |
| 7,689,983 | B2 | * | 3/2010 | Kitayama ..................... 717/170 |
| 7,694,277 | B2 | * | 4/2010 | Yuknewicz et al. ........... 717/121 |
| 7,752,617 | B2 | * | 7/2010 | Blinick et al. ................. 717/170 |
| 2003/0128197 | A1 | * | 7/2003 | Turner et al. .................. 345/204 |

(Continued)

FOREIGN PATENT DOCUMENTS

JP  2002-229791 A  8/2002

(Continued)

OTHER PUBLICATIONS

Cadot et al., ENSEMBLE: A Communication Layer for Embedded Multi-Processor Systems, Aug. 2011, 8 pages, <http://delivery.acm.org/10.1145/390000/384207/p56-cadot.pdf>.*

(Continued)

*Primary Examiner* — Thuy Dao

(74) *Attorney, Agent, or Firm* — Crowell & Moring LLP

(57) ABSTRACT

An embedded controller development tool which generates an interface means for preserving and outputting a control data calculated by the control operation means based on a specific computational procedure, and providing said control data to a plurality of control operation means including said control operation means; wherein the control operation means is described as a function in the source code of the program, the reference data used for calculation by said control operation is an argument of the function, said control data calculated by said control operation means is the argument of the function which points the return value or the address of said function.

10 Claims, 16 Drawing Sheets

U.S. PATENT DOCUMENTS

| | | | |
|---|---|---|---|
| 2003/0135842 A1* | 7/2003 | Frey et al. | 717/121 |
| 2003/0154470 A1* | 8/2003 | Applin et al. | 717/170 |
| 2004/0015960 A1* | 1/2004 | Wanchoo et al. | 717/178 |
| 2004/0133879 A1* | 7/2004 | Yoshimura et al. | 717/120 |
| 2005/0010915 A1* | 1/2005 | Chen | 717/170 |

FOREIGN PATENT DOCUMENTS

JP    2002-271333 A    9/2002

OTHER PUBLICATIONS

Chou et al., Synthesis and optimization of coordination controllers for distributed embedded systems, Jun. 2000, 6 pages, <http://delivery.acm.org/10.1145/340000/337520/p410-chou.pdf>.*

"MATLAB Expo 2002 model-based control system design conference material" CyberNet System Co., Ltd., pp. 103-126.

Japanese office action dated Oct. 17, 2006 with English translation.

* cited by examiner

FIG. 8

```
extern void TVO_Calculate(unsigned short TargetTorque,
                ...,
                      unsigend short Variable_A,
                      unsigned short *TVO
                      );

/* EOF */
```
C11

```
void TVO_Calculate(    unsigncd short TargetTorque,
                           .
                           .
                           .

unsigend short Variable_A,
                      unsigned short *TVO
)
{
           .
           .
           .
    *TVO=TargetTorque*Kt+Variable_A*Ka;
}
/* EOF */
```
C12

FIG. 9

```
unsigned short TVO;

/* EOF*/
```
C21

```
#define TVO_Get() TVO
extern unsigned short TVO;

/* EOF*/
```
C22

```
#include "TVO.h"

#include "TargetTorpue.h"
    .
    .
    .
#include "variableA.h"

#define TVO_Update() ¥
{¥
   TVO_Calculate(¥
    TargetTorque_Get()¥
       .
       .
       .
     varialbeA_Get(),¥
       &TVO¥
      )¥
}

/*EOF*/
```
C23

EMBEDDED CONTROLLERS AND DEVELOPMENT TOOL FOR EMBEDDED CONTROLLERS

This application is a divisional of U.S. patent application Ser. No. 10/739,222, filed Dec. 19, 2003, the entire disclosure of which is incorporated herein by reference, which in turn claims the priority of Japanese application 2002-369167, filed Dec. 20, 2002.

BACKGROUND OF THE INVENTION

The present invention relates to an embedded controller and a development tool for embedded controllers.

As an embedded or built-in software, an embedded controller, and an embedded software development tool so far, there is a method of generating automatically the interface program of a basic program according to the input information from a programming person (For instance, Japanese Patent Application Laid-Open No. 2002-229791, page 4 and FIG. 1(b)).

Moreover, there is a method of generating automatically the source code by using the control system design support software (MATLAB and Simulink) to make the embedded software so far (For instance, CyberNet System Co., Ltd. publication, "MATLAB Expo 2002 model-based control system design conference material", pp 103-126).

SUMMARY OF THE INVENTION

For instance, in the electronic controller for a vehicle, the embedded controller development tool and the development process to improve the development efficiency of the software for the embedded controller has been researched. They are required to generate automatically the source code of the software for the embedded controller and to increase the reuse of the software. In the conventional embedded controller, the interface means sets up a part of the basic management means. (For instance, Japanese Patent Application Laid-Open No. 2002-229791). Therefore, even when a part of two or more control operation means is changed, it is necessary to change the entire interface means. That is, there is a problem that the part of the interface means that should not be originally changed must be re-created.

An object of the present invention is to solve the above-mentioned problem, and to increase the reuse of the embedded controller.

Now, there is a method of generating the source code of the control operation means automatically by using the MATLAB and the Simulink so far (For instance, CyberNet System Co., Ltd. publication, "MATLAB Expo 2002 model-based control system design conference material", pp 103-126).

Manual operation was necessary to integrate the handing over of the data between the control operation means generated automatically and the control operation means, and the management of the variables used in the entire embedded controller even if the control operation means is generated by the above-mentioned method.

There is a problem of taking time to describe the source code when the source code of the interface means is described by a person.

An object of the present invention is to solve the above-mentioned problem and to improve the productivity of the embedded controller.

The above-mentioned object is achieved by providing the corresponding interface means to each control operation means in the embedded controller of the present invention.

In an embedded controller development tool in the present invention, the control operation means is described as a function in the source code of the program, the reference data used for calculation by said control operation is an argument of the function, said control data calculated by said control operation means is the argument of the function which points the return value or the address of said function, further comprising; an analyzing means which extracts the specified information from the source code of said control operation means; an interface generating means which generates said corresponding interface means every control operation means based on an analytical result of said analyzing means.

BRIEF DESCRIPTION OF DRAWINGS

FIG. 8 is an illustration of C source codes of the control software components.

FIG. 9 is an illustration of C source code of the interface software.

DETAILED DESCRIPTION OF THE PREFERRED EMBODIMENTS

Figure 1:
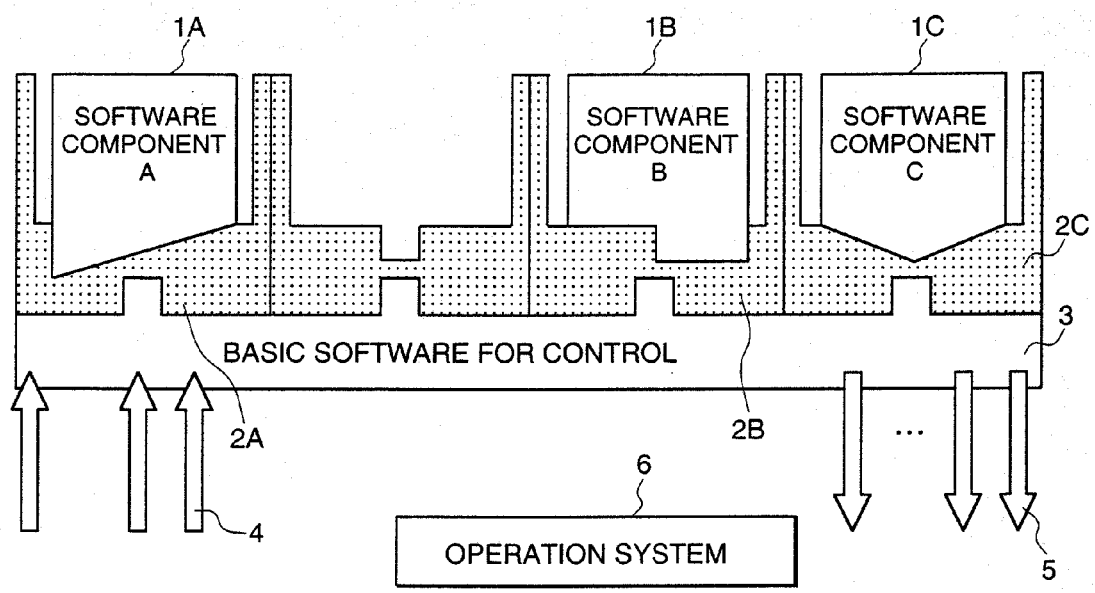
FIG. 1 is an explanatory drawing of the present invention.

An embodiment of the present invention will be explained referring to the drawings.

The vehicle control controller is treated as an example of the embedded controller in this embodiment.

FIG. 1 shows the basic configuration of the application software to which the present invention is applied. Reference numerals 1A, . . . 1B and 1C designate control software components where the update logic of control variable are described. This corresponds to the control operation means in the present invention. 2A, . . . 2B and 2C designate the interface software which corresponds to the control software components.

This corresponds to the interface means in the present invention. Reference numeral 3 designates the basic logic executed in the application software, for instance, the control basic software where the order of updating the variable, that is, the execution sequence of the control software components is described. This corresponds to the control basis processing means in the present invention.

Reference numeral 4 is external input data. The external information is obtained by measuring, for instance, by the sensor included in the hardware, or by communicating with other application softwares and controllers.

This corresponds to the external input processing means in the present invention. Reference numeral 5 designates an information output to the outside. The output to the outside is executed by driving an actuator included in the hardware, or by communicating with other applications and controllers.

This corresponds to the external output processing means in the present invention. Reference numeral 6 designates the operation system which carries out the task control and the interruption management of the embedded software. This corresponds to the basic management means in the present invention. The software components and the interface software are associated with 1A and 2A, and 1B and 2B, respectively. Therefore, when software component 1C is changed for instance, only the interface software 2C is changed. Namely, the interface software 2A and 2B can be used without changing.

That is, there is an effect that the reuse of the embedded software which has the interface software is improved by adopting the configuration shown in FIG. 1. Although only one hierarchy of the application is expressed in FIG. 1, the present invention is not limited to one hierarchy, but applied to all hierarchies. For instance, software components 1A itself can have the configuration shown in FIG. 1. This configuration is effective in the so-called hierarchized embedded software configuration.

Figure 2:
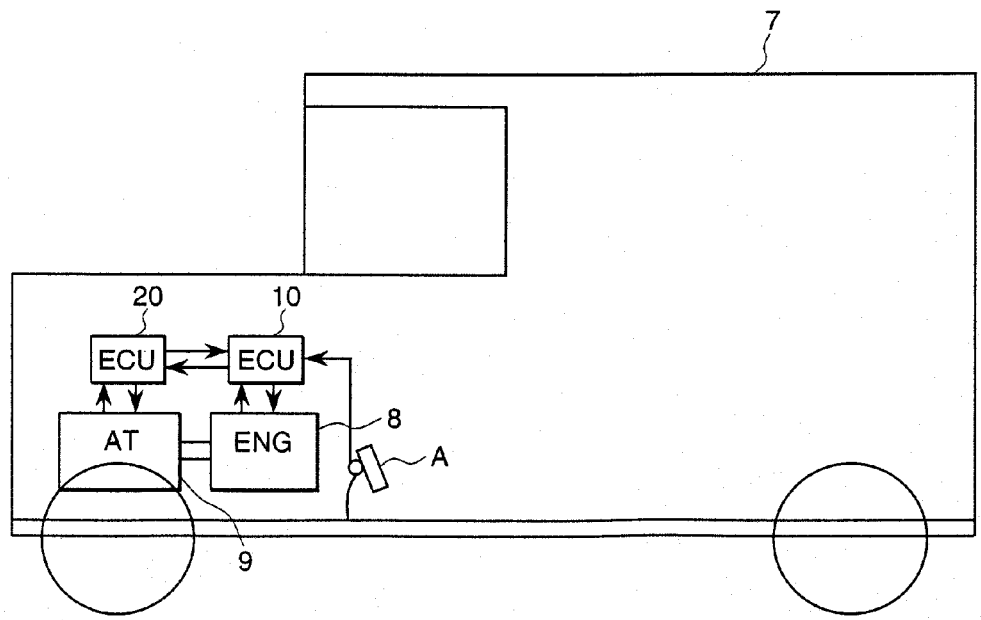
FIG. 2 is a system diagram of an electronic controller for a vehicle according to one embodiment of the present invention.

FIG. 2 shows the vehicle where the present invention was applied.

In this example, vehicle 7 has engine 8, control unit (ECU) 10 to control engine 8, for instance, automatic transmission (AT) 9, control unit (ECU) 20 to control automatic transmission 9, acceleration pedal A operated by a driver. Moreover, control unit (ECU) 20 can be a control unit for the throttle control, not for the automatic transmission. That is, this means the control unit other than one for an engine.

Figure 3:
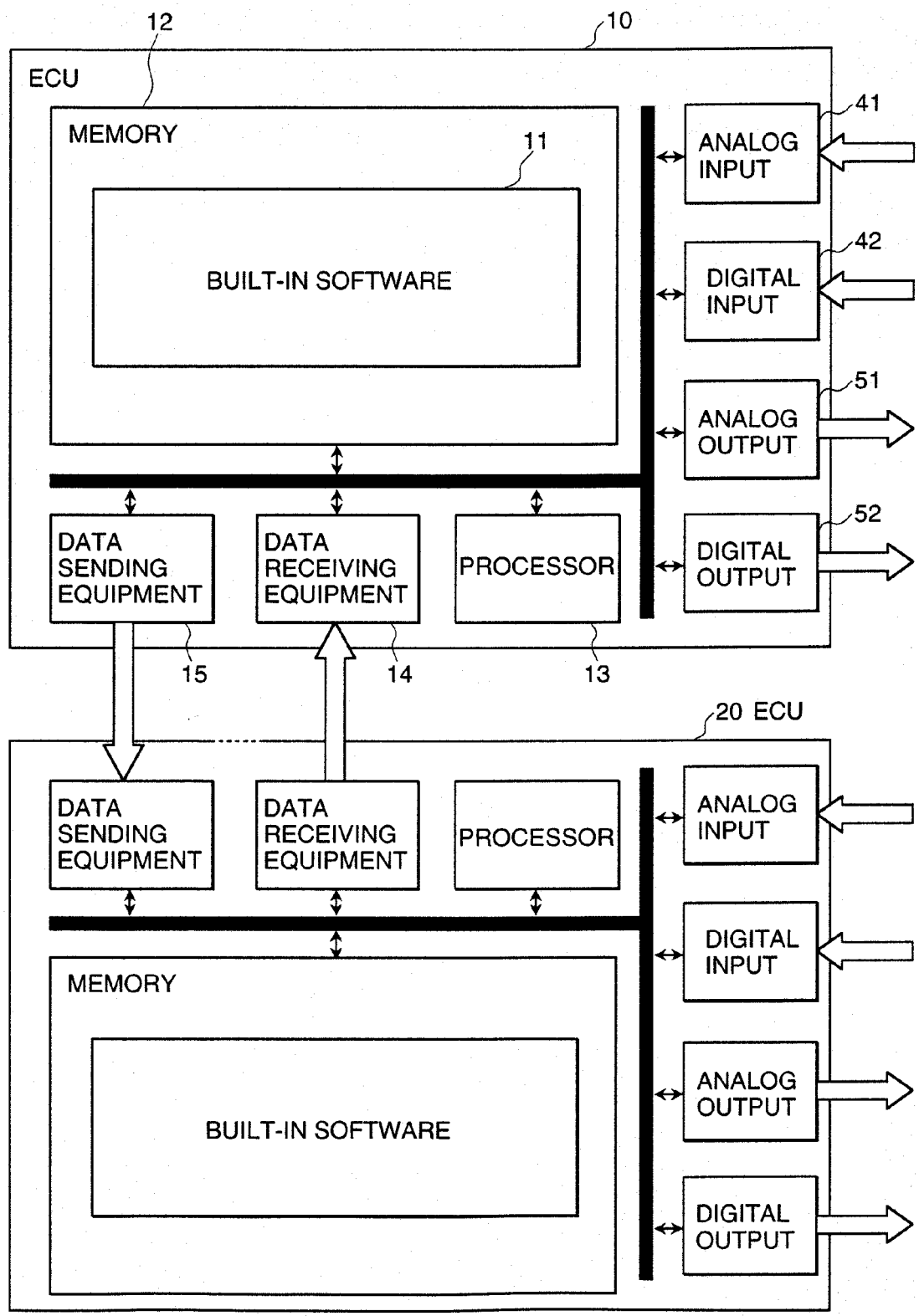
FIG. 3 is a system diagram of the decentralized embedded controller according to one embodiment of the present invention.

FIG. 3 shows the basic configuration of the decentralized control system for a vehicle.

The decentralized control system for a vehicle comprises: control unit (ECU) 10 including processor 13, memory 12, embedded software 11, data sink 14, data source 15, analog input 41 for the A/D conversion output of input to e.g. an airflow sensor, digital input 42 for pulses from e.g. a crank angle sensor, analog output 51 for the voltage to drive peripheral equipment, and digital output 52 for pulses to drive the peripheral equipment; and control unit (ECU) 20 which has the same configuration as ECU 10.

Figure 4:
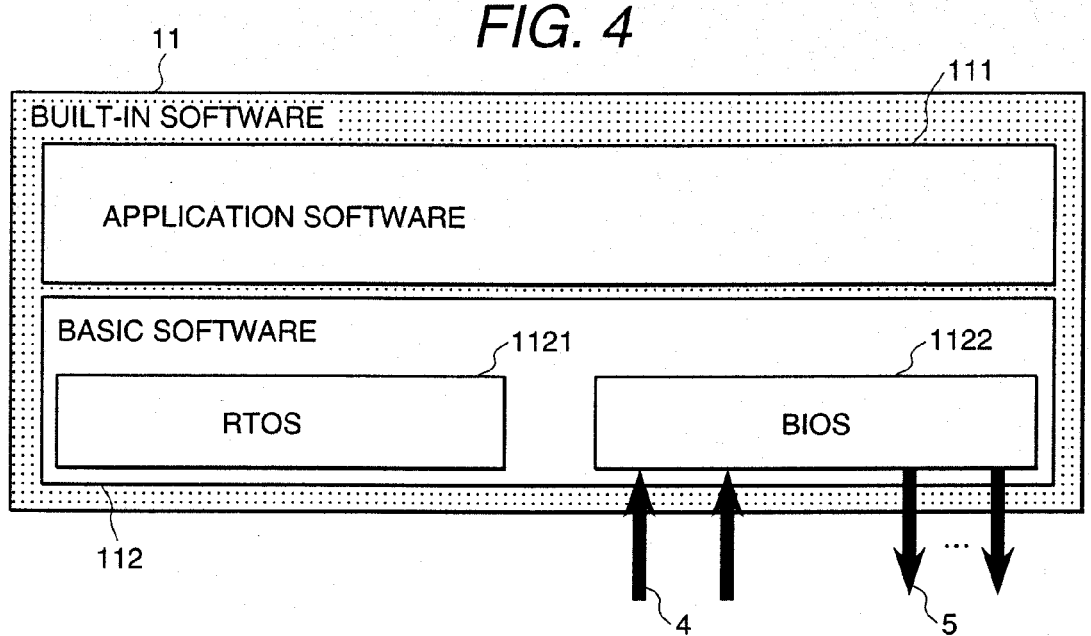
FIG. 4 is a schematic diagram of software for the embedded controller.

FIG. 4 shows an example of the configuration of embedded software 11. As shown in FIG. 4, Embedded software 11 comprises application software 111 and basic software 112. Basic software 112 comprises real time operation system (RTOS) 1121 and basic input/output system (BIOS) 1122. RTOS 1121 starts the task of the time cycle and the task which synchronizes with the external input, and provides interrupt disabled processing and the call service for other tasks to application software 111.

BIOS 1122 receives the demand from the application software 111, and reads external input data 4 and outputs external output data 5. By adopting the configuration of FIG. 4, it is possible to separate the part (BIOS) which depends on hardware in the embedded software, the real-time control functions such as the interruption signal processing and the timer processing, etc., the application part which depends on the controlled system such as the ignition control etc. of the engine and the gear-shift control of the transmission. For instance, there is an advantage that only BIOS is changed when CPU changes, and the application software can be used as it is.

Figure 5:
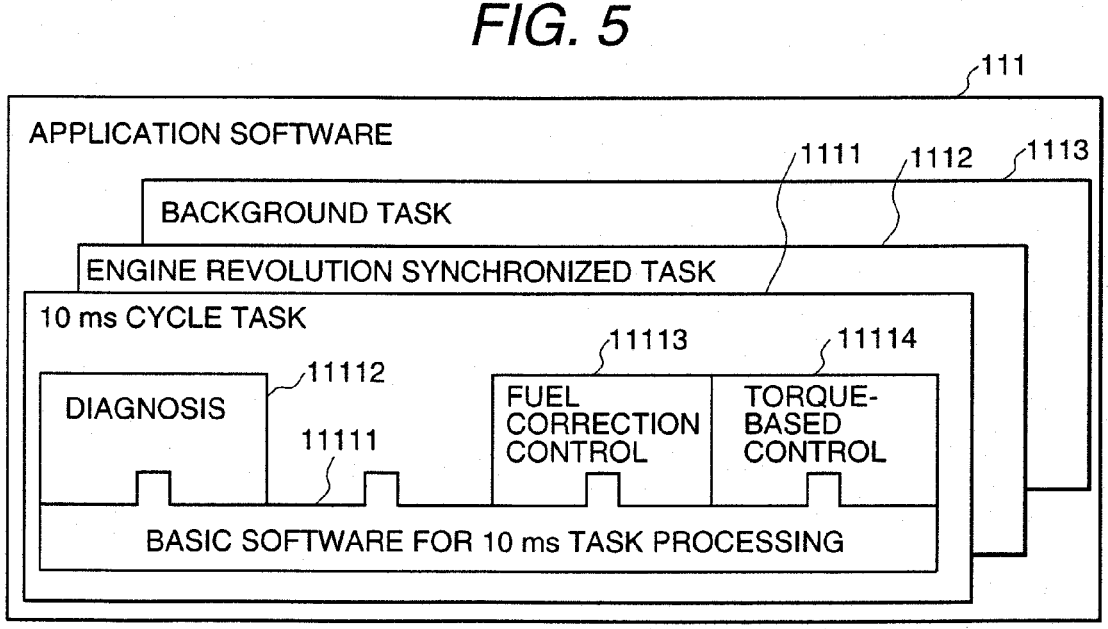
FIG. 5 is a schematic diagram of the application software.

FIG. 5 shows an example of the configuration of the application software.

Application software 111, for instance, comprises a task which is started at a fixed cycle like 10 ms cycle task, a task which is started in synchronization with the external signal like engine revolution synchronized task 1112, etc. of start like cycle of ten ms task 1111 at constant cycle synchronizing with external signal, and a task executed when processor is not used like background task 1113. Each of these tasks comprises the task processing basic software and the control application.

For instance, the 10 ms cycle task comprises a 10 ms task processing basic software, diagnosis control 11112, fuel correction control 11113, torque-based control 11114, and other controls. The symbol " . . . " in the figure means that the control logic is not limited to the above-mentioned three kinds of logics.

Figure 6:
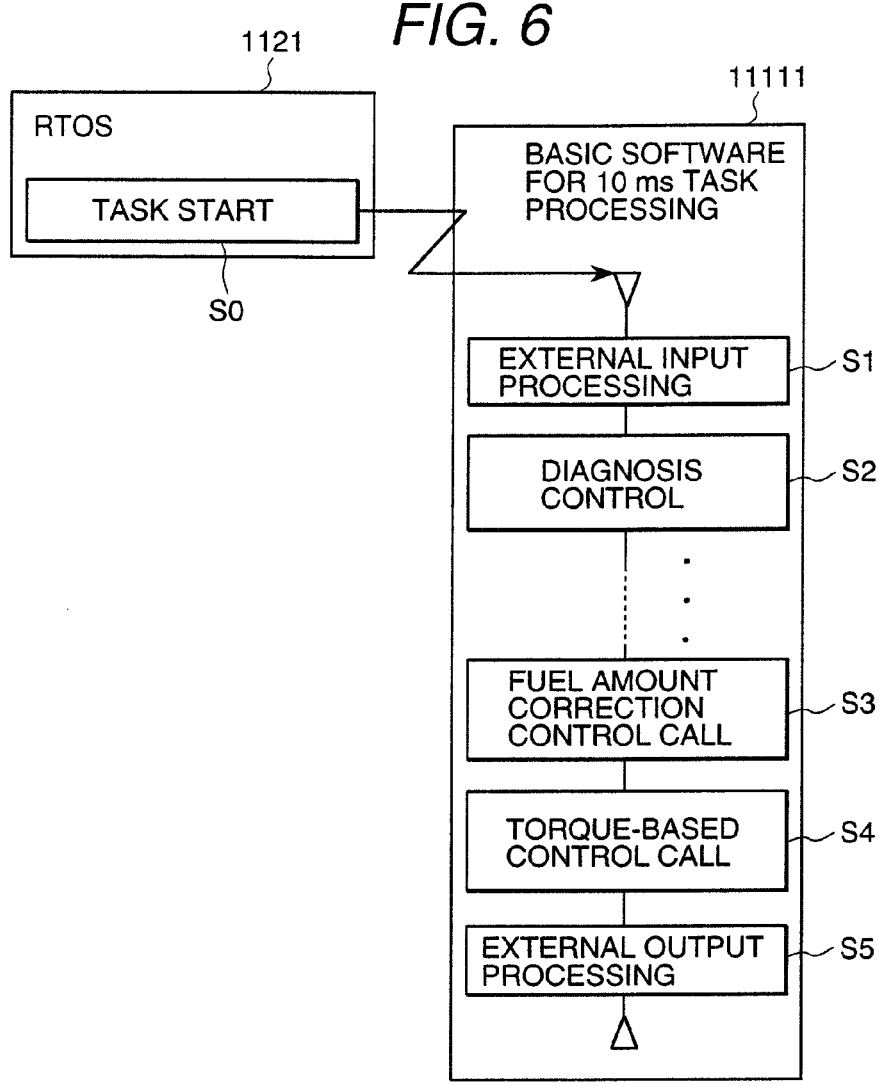
FIG. 6 is a flow chart of the task processing software.

FIG. 6 shows the operation of 10 ms task processing basic software 11111. RTOS 1121 executes the start processing of 10 ms task processing basic software 11111.

As a result, the processing of 10 ms task processing basic software 11111 is executed. In step S1, an external input processing is requested to BIOS 1122, and the latest value of the sensor which updates the input value to the airflow sensor, etc. In step S2, diagnosis control 11112 is executed. Then, some controls are executed. In step S3, fuel correction control 11113 is executed. In step S4, torque base control 11114 is executed. In step S5, the external output processing is requested to BIOS 1122, and processing is ended.

By adopting the configuration shown in FIG. 5 and FIG. 6 as the application software, it becomes possible to process input processing S1 from the outside, control processing S2, S3, S4 of which the objects are different, and output processing S5 to the outside in the same task.

Figure 7:
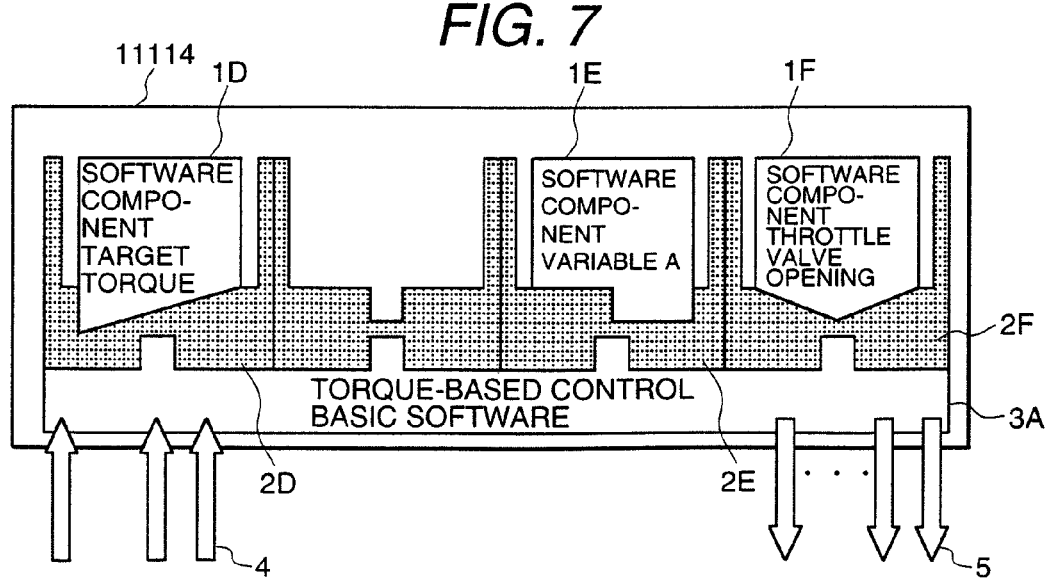
FIG. 7 is a block diagram of the torque base control application.

FIG. 7 shows a basic configuration of the torque base control application software to which the present invention is applied. 1D, 1E, and 1F are the control software components which the target torque, variable A, and the update logic of control variable of the throttle opening are described, respectively. 2D, . . . , 2E and 2F are interface software which correspond to the control software components 2D, 2E and 2F, respectively. 3A is a torque base control basic software where the order of updating the variable of the control software components in the torque base control, that is, the execution sequence is described. 4 is external input data obtained from BIOS 1122. For instance, said external information is obtained by measuring by using the sensor, and communicating with other applications and controllers.

Reference numeral 5 designates the information output to the outside by BIOS 1122. Said external output is executed by driving actuator or communicating with other applications and controllers. By adopting the configuration shown in FIG.

7, only interface software 2D is changed, for instance, when software component 1D which operate the target torque is changed, and interface software 2E and 2F can be used without being changed. That is, there is an effect that the reuse of the embedded software which has the interface software is improved by adopting the configuration shown in FIG. 7.

FIG. 8 shows an example of the control software component 1F shown in FIG. 7.

Here, C11 is a header file (TVO_Calculate.h) when software component 1 to update the throttle opening (henceforth TVO) is updated is described with C language. C12 is a source file (TVO_Calculate.c) when software component 1 to update TVO is described with C language. In C11, The prototype of the function to renew TVO is declared. That is, the external declaration (extern) of the function, the type (void) of the return value of the function, the function name (TVO_Calculate), the type of the input value of the function, variable name (unsigned short TargetTorque, . . . , unsigned short Variable_A), and the variable which the function updates, in a word, the type of the output value of the software component and the pointer of variable name (unsigned short TVO) are declared. Whether the argument of the function is an input variable or an output variable is judged by whether identifier (*) to show the pointer argument is attached at the head of variable name. Said output variable corresponds to the control data calculated by the control operation means in the embedded controller in the present invention.

C12 describes the function to renew TVO. That is, the type (void) of the return value of the function, the function name (TVO_CAlculate), the type and variable name (unsigned short TargetTorque, . . . , unsigned short Variable_A) of the input value which is the argument of the function, the variable which function updates, in a word, the type of output value of software component and the pointer of variable name (unsigned short TVO) are defined, and the method (*TVO=TargetTorque*Kt+Variable_A*Ka) of renewing TVO is described. Target Torque and Variable_A are variables, and Kt and Ka are constants.

FIG. 9 shows C source codes C21, C22, and C23 as one example of interface software 2F shown in FIG. 7. They correspond to the control software components explained in C11 and C12 of FIG. 8. C21 is variable declaration C source file (TVO.c). C22 is C header file (TVO.h) to define the variable reference instruction, and C23 is C header file (TVO_Update.h) to define the variable update instruction.

In C21, the variable declaration (unsigned short TVO) of TVO which is the output variable of corresponding software components C11 and C12 is performed. In C22, the definition (#define TVO_Get( ) TVO) of the instruction to which the variable refers and the type and the name (extern unsigned short TVO) of the variable which is the external variable declaration of TVO are performed to refer to variable TVO declared in C21 by other interface software.

In C23, the instruction executed when control basic software 3 requests the update of the variable TVO is defined. That is, the described C header file is read by the instruction to refer to the input variable (#include "TVO.h"-#include "variable_A"), the instruction name to update the variable is defined (#define TVO_Update( )¥), the function name of control software component C12 actually called is described (TVO_Calculate . . . ), the instruction to refer to control variable which becomes an input of the function to renew TVO is called (TargetTorque_Get( ) . . . variableA_Get( )), and the address of variable TVO is designated as an output of the function to which TVO is renewed (& TVO).

In FIG. 9, the instruction called to update the variable by software components C 11 and C12 corresponding to interface software C21-C23 is only TVO_Update( ). When the update of the variable is demanded (TVO_Update( )), the interface software collects input values necessary for calling the function to update the variable (TargetTorque_Get( ) . . . variableA_Get( )) and designates the variable as an output (&TVO). Then, the function to update the variable is updated and afterwards is called (TVO_Calculate( )).

By adopting the configuration shown in FIG. 9, for instance, when the update of the variable is required from the control basic software, the variable can be updated in the common instruction format completely considering neither the number, the type of the input value of the function described in the control software components nor variable name. Moreover, the operation of the update and the declaration of the I/O variable can be separated from the control software components, and the independence of the control software components is improved.

Figure 10:
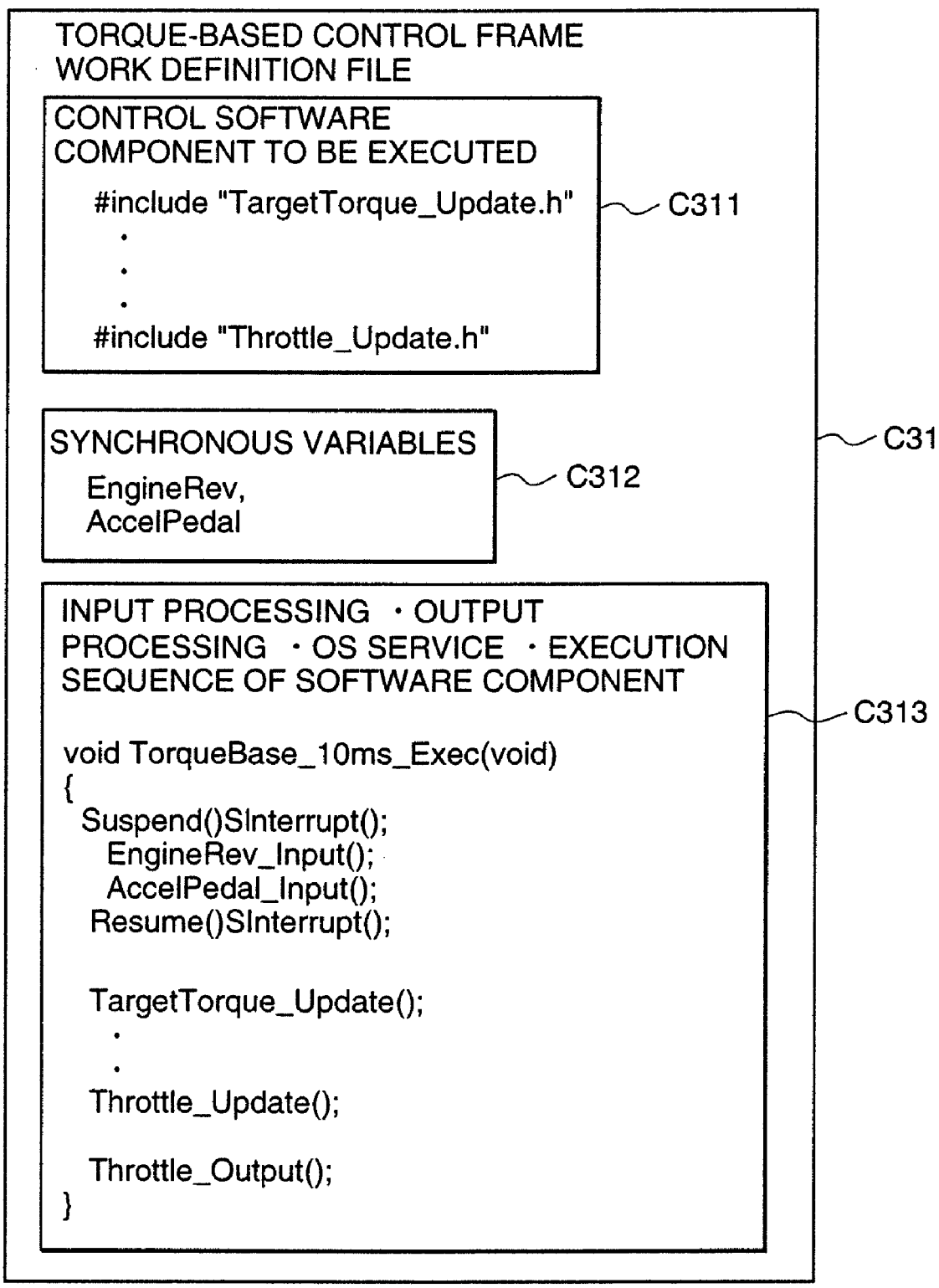
FIG. 10 is a view showing the definition information on the torque base control framework.

As one example of the control basic software, FIG. 10 shows the control basic software of the torque-based control by which engine power is controlled (hereinafter, called torque-based control framework) C31. In C311, the control software components executed in the torque-based control basic control part 3A of FIG. 7 are defined, and the information defined by the corresponding interface software is read. Moreover, the variable that the simultaneity is demanded inside of the control basic software 3 is defined in C312. Further, the input processing, the output processing, OS service and the execution sequences of software components executed by the control basic software are defined in C313.

Figure 11:
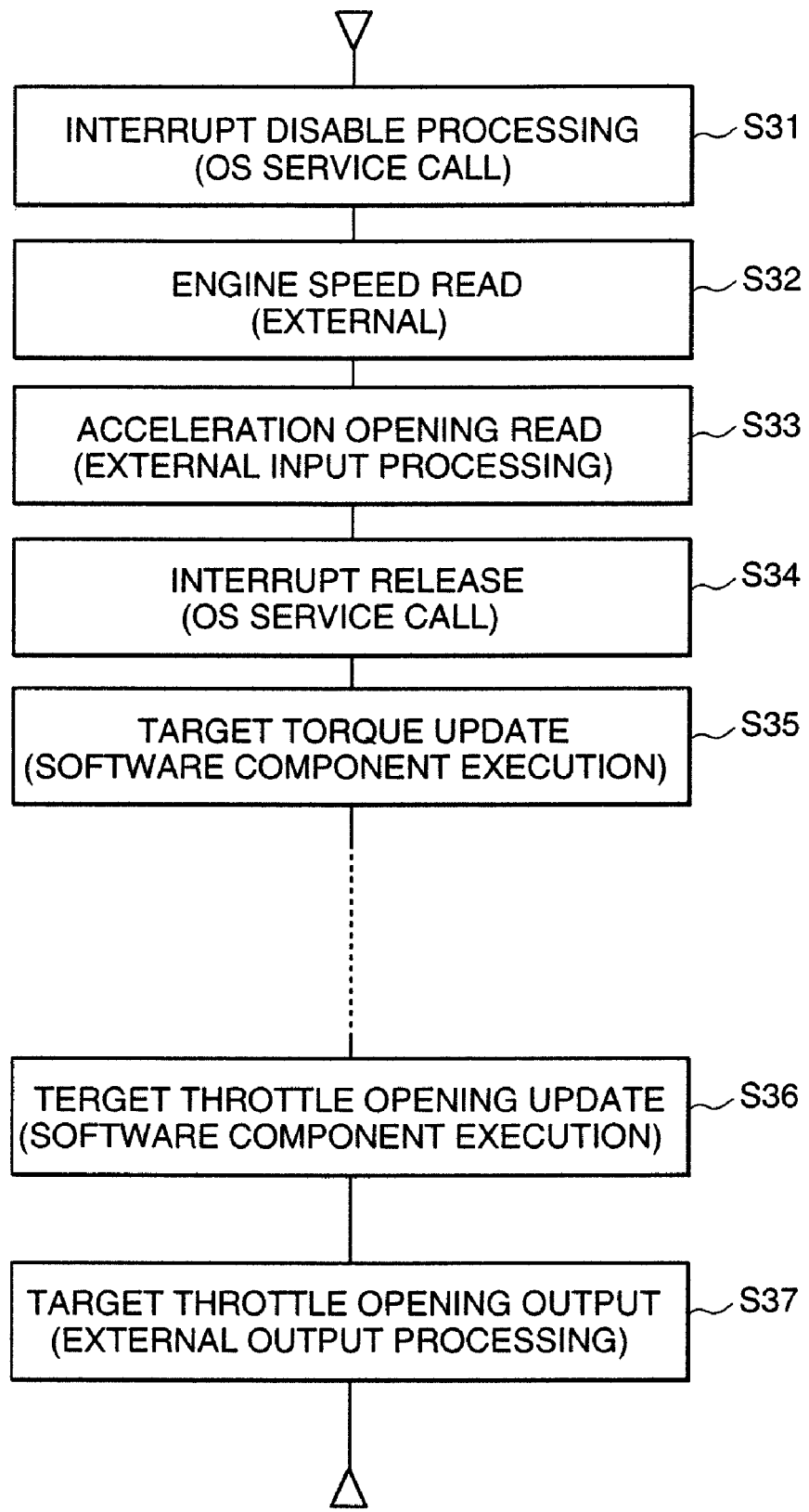
FIG. 11 is a flow chart of the torque base control framework.

FIG. 11 shows the executing processing in the torque-based control basic control part 3. The execution sequence of control basic software 3 is defined in C313 of FIG. 10. In step S31, interrupt disabled processing (OS service) is called, and the task execution which synchronizes with the external signal is prohibited. As a result, the simultaneity of the input value comes to be kept. In step S32, engine speed is read from external input data 4. In step S33, the opening of the accelerator is read from external input data 4. In step S34, the interrupt disabled release processing (OS service) is called. In step S35, the update of the variable to designate the target torque is demanded (software component execution). In step S36, the update of the variable to designate the target throttle opening is demanded (software component execution). In step S37, the target throttle opening is instructed to the external electronically controlled throttle (external output processing) and processing are ended.

There are the following advantages by composing the control basic software as shown in FIG. 10 and FIG. 11. The part where the variable is calculated in the embedded software, that is, control software components 1D, . . . , 1E and 1F shown in FIG. 7 is frequently changed to adjust the control characteristic like the debugging of the control logic and the time constant, etc.

While, there is the part where the change is comparatively few like a part where the order of updating the variable etc. are provided, that is, a part of the control basic software shown in FIG. 10 and FIG. 11. It is possible to separate the part where a lot of changes exist and the part where the change is few by composing the control basic software as shown in FIG. 10 and FIG. 11. Therefore, there is an advantage that the reuse of the control basic software component is improved.

Figure 12:
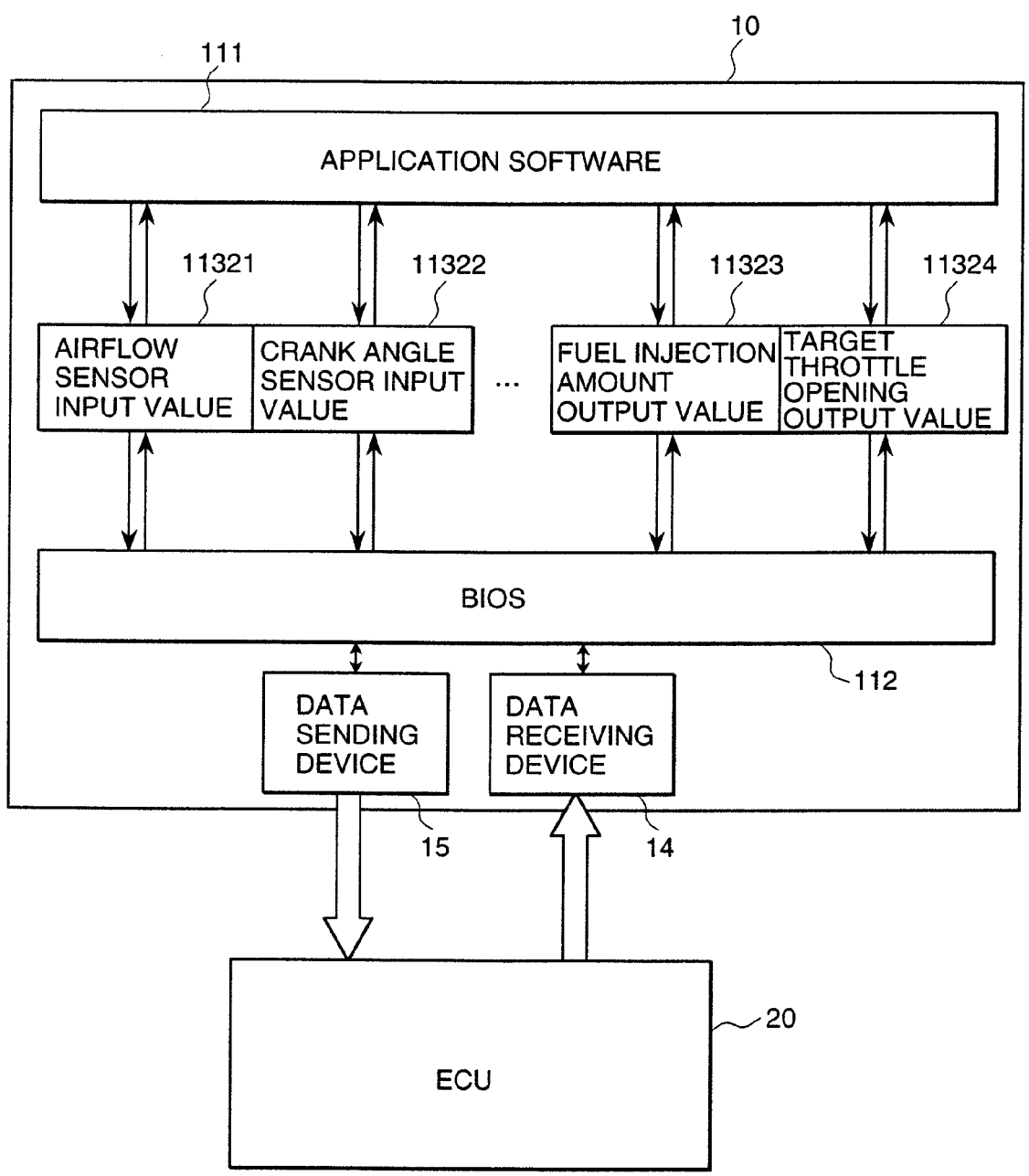
FIG. 12 is a system diagram in the I/O operation part in the decentralized control system.

FIG. 12 shows one example of the configuration of the BIOS interface software. Numeral 11321 designates BIOS interface software corresponding to the airflow sensor input, 11322 BIOS interface software corresponding to the crank angle input value, 11323 BIOS interface software corresponding to injection quantity, and 11324 BIOS interface software corresponding to the target throttle opening. The configuration of BIOS interface software is similar to that of the interface software shown in FIG. 9. By adopting the configuration shown in FIG. 12, for instance, when the update of the external input value is required from the control basic software, the external input value can be updated in the common instruction format completely considering neither the number, the type of the input value of the function described in the control software components nor variable name. Moreover, the operation of the update and the declaration of the I/O variable can be separated from the control software components, and the independence of the control software components is improved. It is similar also for an external output. Moreover, the operation of the update and the declaration of the I/O variable can be separated from BIOS, and the independence of BIOS is improved.

Figure 13:
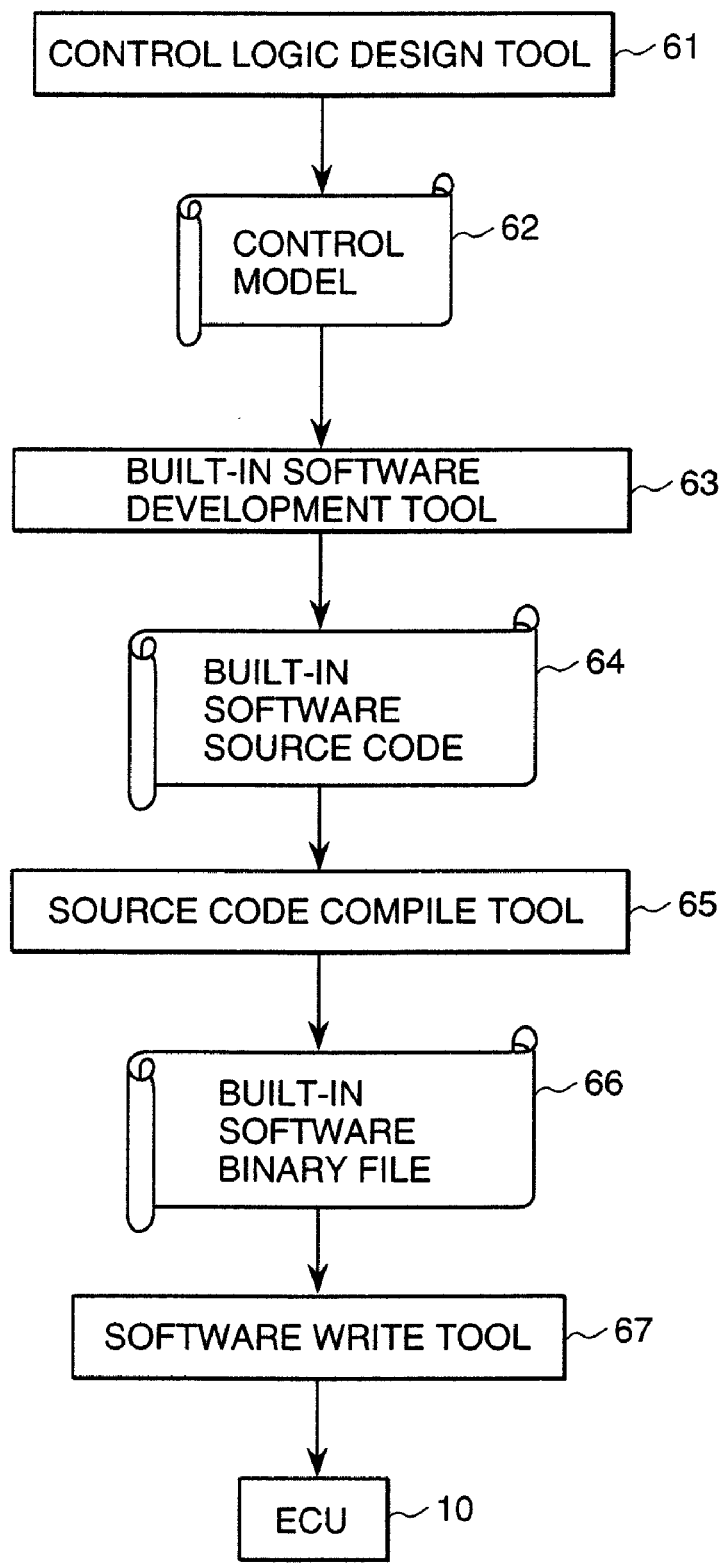
FIG. 13 is a software development process diagram for the embedded controller.

The development process of the embedded software is shown in FIG. 13. The tool shown in FIG. 13 includes the program, the software, and the device.

Control model 62 is constructed by control logic design tool 61. Embedded software source code 64 is made by embedded software development tool 63 based on control model 62. Further, binary file 66 of the embedded software is made by using source code compilation tool 65. Moreover, the embedded software is written in control unit (ECU) 10 by using software write tool 67.

Figure 14:
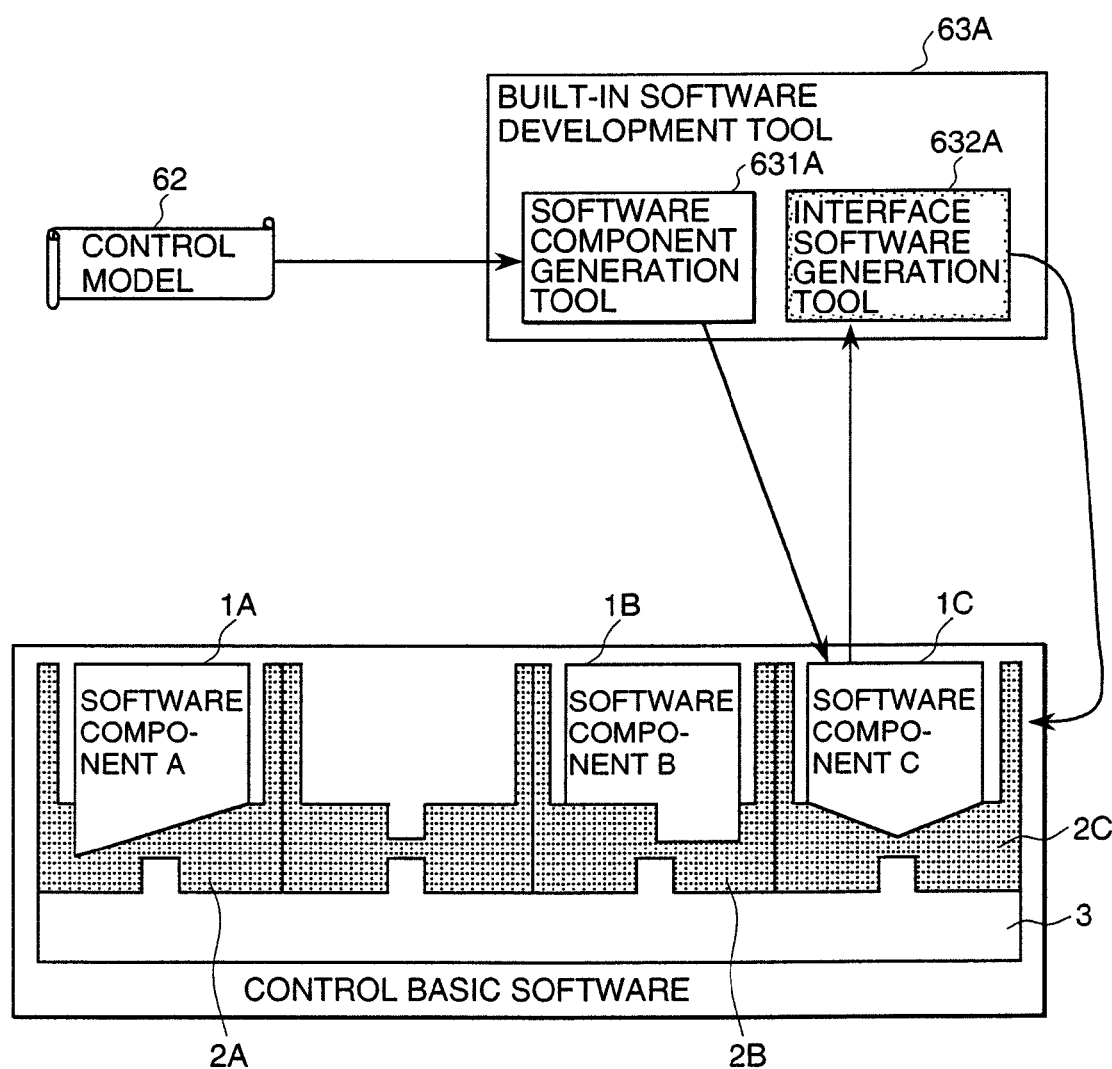
FIG. 14 is a view showing embedded software development means 1.
Figure 15:
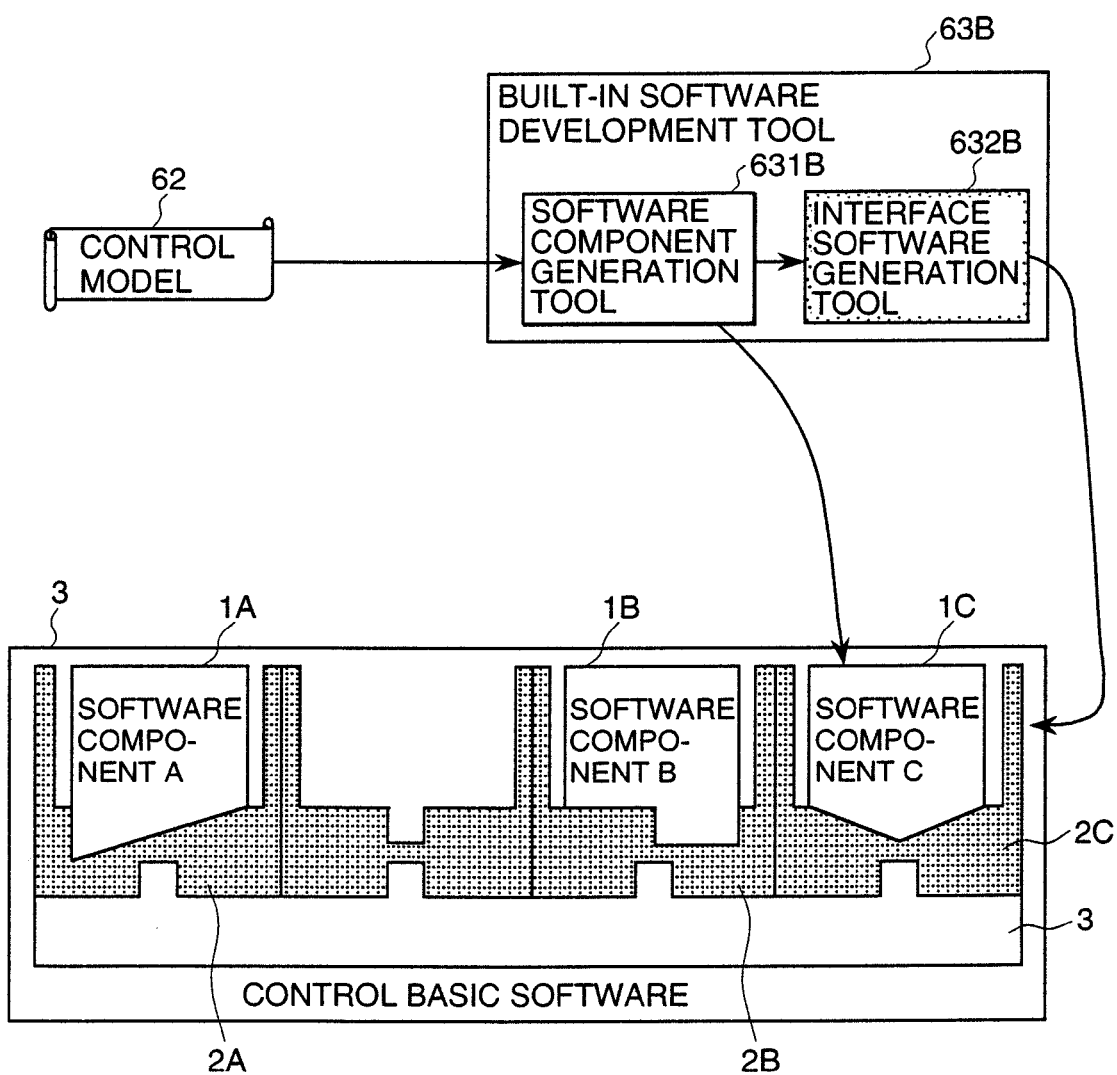
FIG. 15 is a view showing embedded software development means 2.
Figure 16:
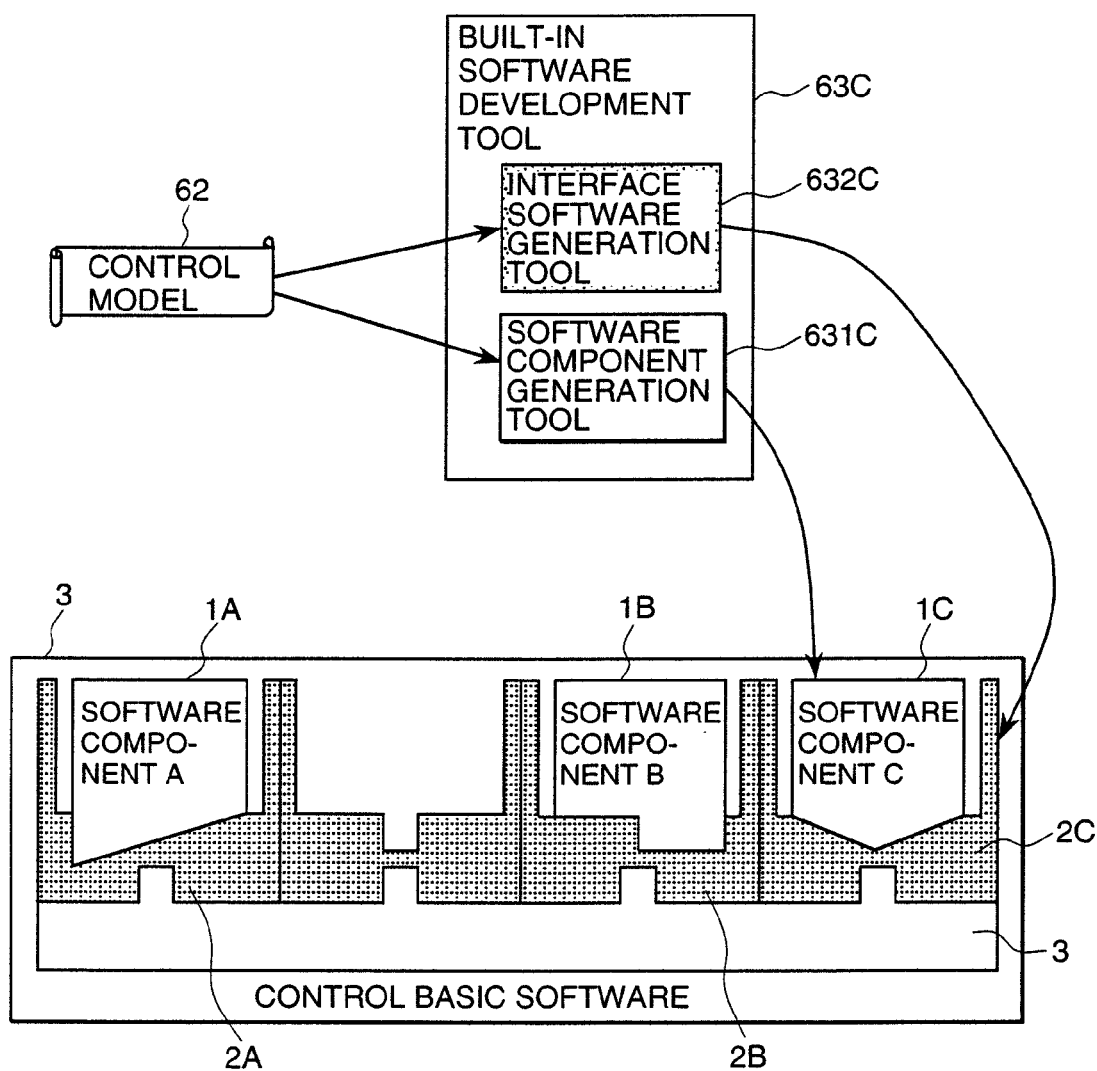
FIG. 16 is a view showing embedded software development means 3.

The example of software development tool 63 is shown in FIG. 14 to FIG. 16.

FIG. 14 shows the embedded software development tool 63A as one example of embedded software development tool 63.

Software components 1 are generated from control model 62 by the software component generation tool 631A. The interface software generation tool 632A generates corresponding interface software 2 referring to generated software components 1.

FIG. 15 shows embedded software development tool 63B as one example of embedded software development tool 63. Software components 1 are generated from control model 62 by software component generation tool 631B.

Interface software generation tool 632B receives information necessary for generating the interface software from software component generation tool 631B, and generates interface software 2 corresponding to software components 1.

FIG. 16 shows the embedded software development tool 63C as one example of embedded software development tool 63.

Software components 1 are generated from control model 62 by with the software component generation tool 631A. The interface software generation tool 632A generates corresponding interface software 2 referring to control model 62. The software components for the embedded software and the interface software becomes possible to generate automatically by adopting the configuration of the embedded software development tool shown in FIG. 14, FIG. 15, and FIG. 16. Therefore, the necessity manually coded disappears. Further, because the coding mistake decreases, the debugging work can be reduced. As a result, the development efficiency of software improves.

Figure 17:
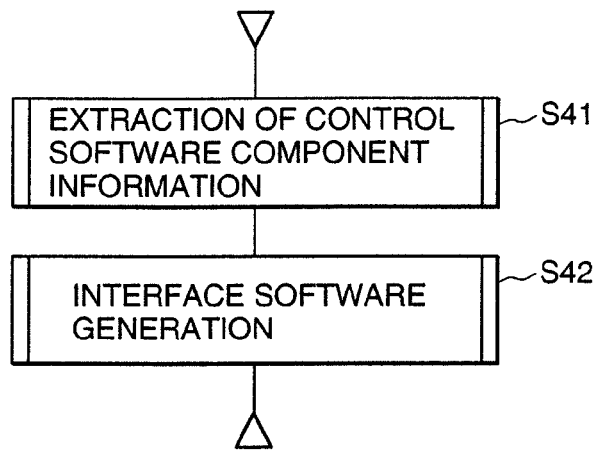
FIG. 17 is a flow chart of the interface software automatic generation.
Figure 18:
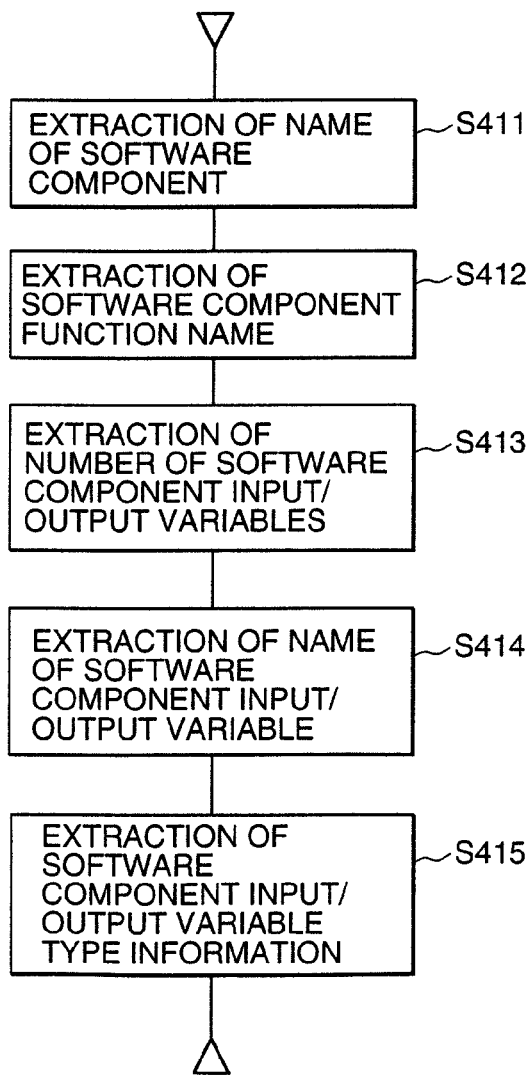
FIG. 18 is a flow chart of the control software component information extraction.
Figure 19:
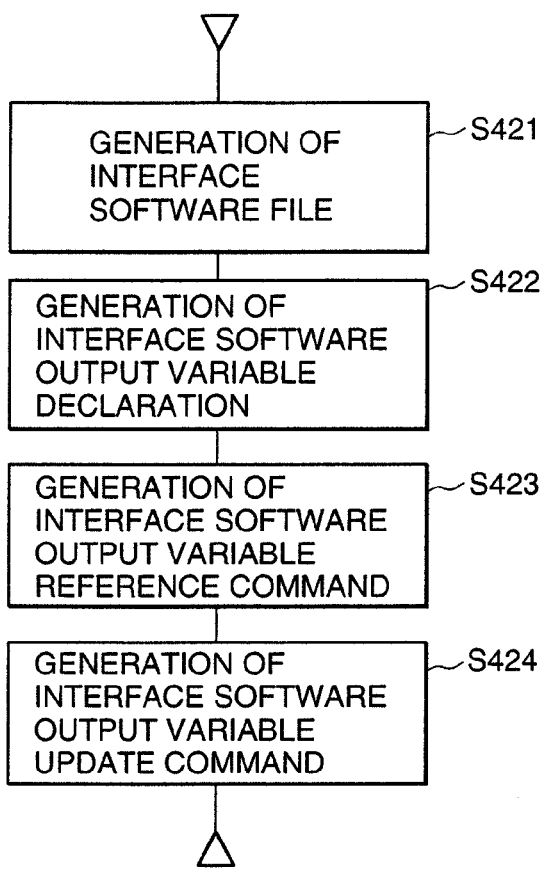
FIG. 19 is an interface software generation flow chart.

FIG. 17, FIG. 18, and FIG. 19 show the concrete procedure of automatic generation of the interface software.

FIG. 17 shows the processing of interface software generation means 632. In step S41, information on the control software components is extracted, and the interface software is generated in step S42. The detailed content of step S41 is shown in FIG. 18. Moreover, the detailed content of S42 is shown in FIG. 19.

FIG. 18 shows details of control software component information extraction processing S41 as example of the control software components shown in FIG. 8.

First of all, the file name is extracted in step S411. That is, file name "TVO_Calculate.c" of C11 and C12 shown in FIG. 8 and "TVO_Calculate.h" are extracted. Next, function name is extracted in step S412. That is, function name "TVO_Calculate" described to C11 shown in FIG. 8 is extracted. In step S413, the number of I/O variables is extracted. That is, the I/O variable of function "TVO_Calculate" of C12 shown in FIG. 8 is counted. In step S414, I/O variable name is extracted based on the number of variables counted in S413. That is, "Target Torque" and "variable_A" in C12 shown in FIG. 8 are extracted as an input variable, and "TVO" is extracted as an output variable. The output variable is identified by "&" put on at the head of the variable name, which designates the pointer argument. In step S415, the I/O variable form is extracted. That is, variable type "unsigned short" of "Target Torque", etc. in C12 shown in FIG. 8 are extracted. Said input variable corresponds to the reference data in the embedded controller development tool in the present invention. Said output variable corresponds to the control data in the embedded controller development tool in the present invention.

FIG. 15 shows the details of interface software generation processing S42.

The example of generating the interface software is explained referring to FIG. 9. In step S421, the file of the interface software is generated from file names of the software components extracted in step S411. That is, the software component name of "TVO" is obtained by deleting the character after "_" defined as separator in the embedded controller from "TVO_Calculate.c" and "TVO_Calculate.h".

The following files are generated as interface software corresponding to the software components. "Name of extracted interface software" File of + ".c", "Name of extracted interface software" File of + ".h", "Name of extracted interface software" File of + "Update.h". That is, these are "TVO.c" "TVO.h" "TVO_Update.h" shown in FIG. 9.

Next, in step S422, the name of output variable of the software component extracted in step S414 and the declaration part of the variable which becomes an output of the software component with type information on output variable of the software component extracted in S415 is generated in the file "Name of the extracted interface software"+".c". That is, the instruction to allocate the variable of variable name of the extracted output variable by the type of the extracted output variable in the memory is output to the source file. This is "unsigned short TVO;" in C21 shown in FIG. 9. In this case, the part of "unsigned Short" is the type of the output variable, and the part of "TVO" is the variable name of the output variable. Reference instruction of output variable of the software component is generated in step S423 based on name of output variable of the software component extracted in step S414. That is, this is "#define TVO_Get( ) TVO" in C22 shown in FIG. 9. This is defined as a macro of the name "Variable name of the output variable"+"_Get( )", and the substance becomes an output variable name. Therefore, when the macro is described in the source code, and the source code is converted with a pre-processor, the macro for the reference is replaced with the variable of the reference ahead in the source code. In step S424, An output variable update instruction is generated based on name of the I/O variable of the software component extracted in step S414 and the type information on input variable of the software component extracted in step S415. That is, this is C23 shown in FIG. 9. The macro "Output variable name"+"_Update( )" is defined as an output variable update instruction. The substance of the macro is allocated in operation function "TVO_Calculate" of the output variable extracted in step S412. Pointer "&TVO" which designate the address of the output variable "TVO", input variable "Target Torque", reference instruction "Target Torque_Get( )" and "variable A_Get( )" of "variable_A" extracted in step S414 is allocated in the argument of the function. Interface software 2 can be generated automatically from control software components 1 and control model 62 by adopting the configuration shown in FIG. 17, FIG. 18, and FIG. 19. Therefore, the necessity manually coded disappears. Further, because the coding mistake decreases, the debugging work can be reduced. As a result, the development efficiency of software improves.

Figure 20:
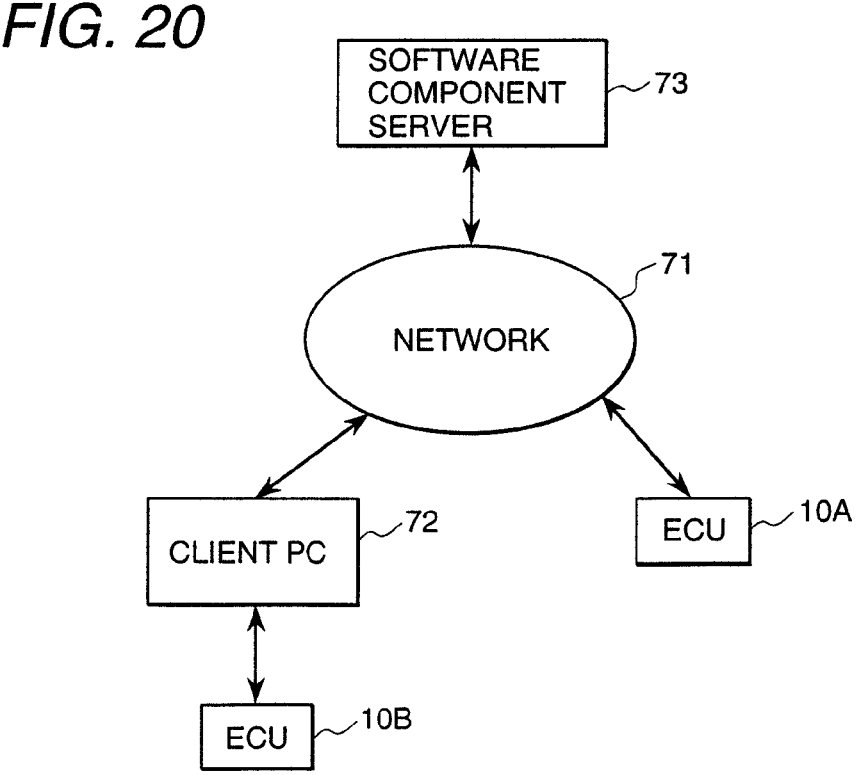
FIG. 20 is an illustration of an embedded software network notice assignment.

FIG. 20 shows the schematic diagram of network notice assignment of the embedded software.

FIG. 20 especially shows an example of software component notice assignment. Software component server 73 is connected with network 71. Client PC72 is connected with software component server 73 through network 71, and software component 1 are transmitted according to the demand from client PC72. Client PC72 can write the received software component 1 in the electronically controlled unit (ECU) 10B. Moreover, it becomes possible for ECU 10A to connect with software component server 73 via network 71 by itself by providing the network connection function for ECU 10A oneself, and update the software component. The following advantages can be obtained by distributing the embedded software shown in this embodiment in the network. In the embedded software of the present invention, only the corresponding interface software 2 is changed when control software component 1 is changed, and basic parts of the control basic software and the task processing basic software, etc. are not changed. Therefore, there is an advantage that the change in software at the service factory becomes easy. Moreover, there is an advantage that the data amount transmitted can be decrease when only the software component is transmitted compared with the case to transmit the whole.

Figure 21:
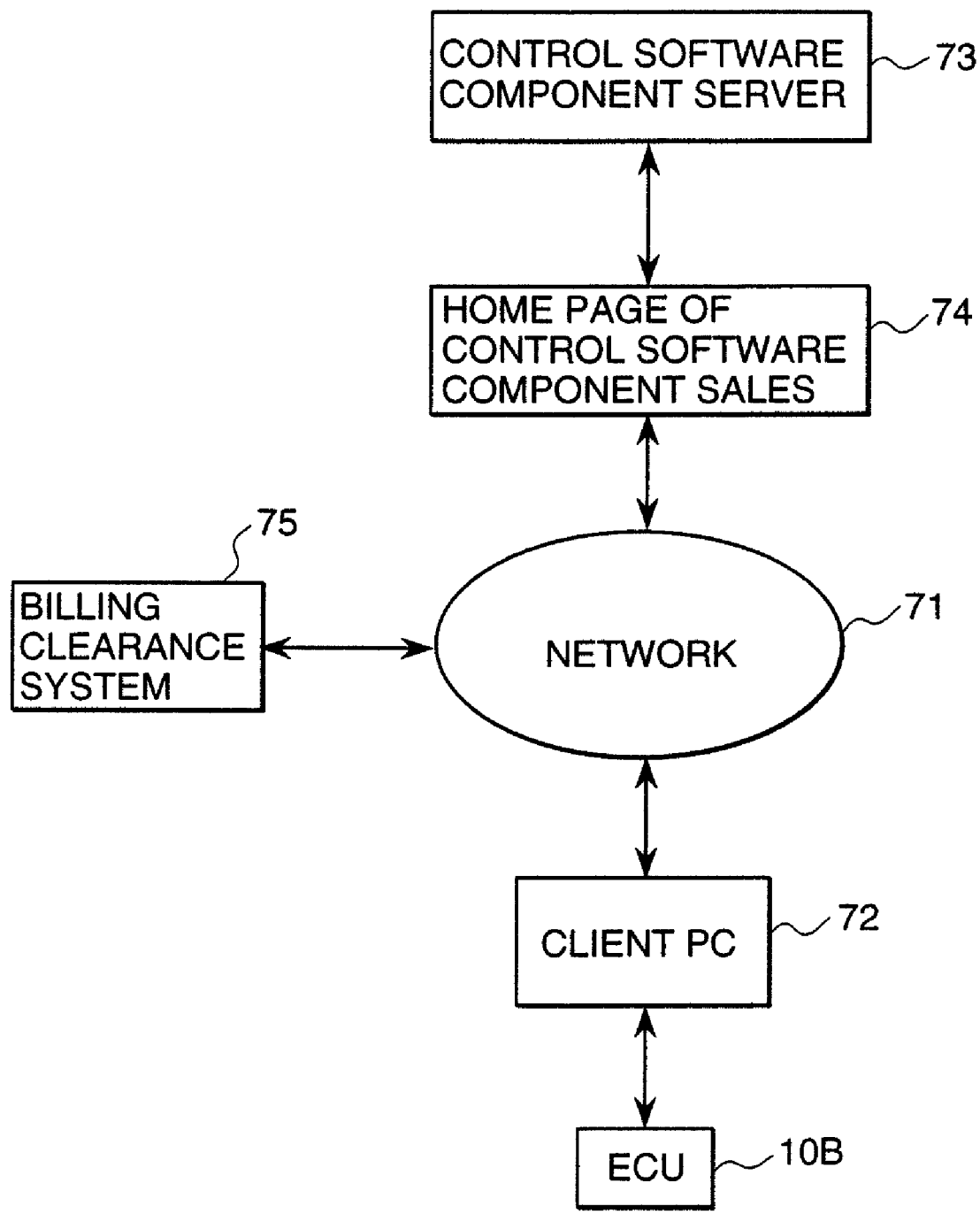
FIG. 21 is an illustration of an embedded software network notice assignment service.

FIG. 21 shows the outline of one example of the embedded software notice assignment service.

Client PC 72 is connected with control software component sales homepage 74 through network 71. Client PC 72 is connected with charge settlement system 75 after control software component 1 downloaded is selected in control software component sales homepage 74, and the settlement in the purchase charge is performed. Then, control software component 1 are downloaded from software component server 73, and is written in control unit (ECU) 10.

The following advantages are obtained by adopting the configuration shown in FIG. 21.

Writing the embedded software becomes possible by attesting by the account system and the homepage for not only the service factory but also the general user. That is, it becomes possible to make the embedded controller of my favor by buying the embedded software of the embedded controller of home electric appliances product, the speed-shift pattern of the automatic transmission and the running mode of a vehicle in the network. The following functions except the operation logic exist together in the control operation means when the control operation means performs the declaration of the variable used in the embedded controller, the input process, and the update, etc.

For instance, processing to allocate the operation result in the specific address of the memory of the embedded controller, processing to refer variable which is output result of other control operation means when operating, reference processing of variable which generates the operation result and generation of the execution interface for control basis means to execute. This means that the function changes other than the operation logic and the verifications are required at the change in the operation logic. That is, the problem that the man-hour according to the software development for the embedded controller increases is caused.

To solve the above-mentioned problem, the output variable reference function that other interface means refer to said output variable which said interface means possesses is provided to said interface means in the embedded controller in the present invention.

To solve the above-mentioned problem, the input variable collection function to collect input variables used when said control operation means corresponding to said interface means calculates by using the output variable reference function in other interface means or in itself is provided to said interface means in the embedded controller in the present invention.

To solve the above-mentioned problem, the interface means specifies the control data to be calculated by the control operation means, and orders the execution of the operation processing by the control operation means, with the data collected by the interface means and used for the operation by the control operation means referred, when the control operation means calculates. That is, the output variable updating function is provided to the interface means.

Software for the embedded controller can be classified into the part frequently changed or the operation logic of the variable and the part reused when almost permanent or the order of updating the variable.

There is a problem that it is necessary to change to the part of the order of updating the variable which should not be changed though it is the change in the operation logic of the variable in software for the embedded controller when this is one program.

In the embedded controller in the present invention to solve the above-mentioned problem, said control basis processing means defines the kind of the control operation means by which execution is ordered, and the execution sequence of said control operation means, said external input processing means, said external output processing means and said basic management means. Said control basis processing means orders the execution of said external input processing means, said control operation means, said external output processing means, and said basic management means.

It is necessary to change the corresponding control operation means to change the method of operating a certain variable when one control operation means operates two or more variables. Therefore, There is a problem that the control operation means by which the operation is done is changed also for the variable to which the operation means is not changed.

To solve the above-mentioned problem, the variable for other control operation means and the external output means to refer is assumed to be one per one control operation means in the embedded controller in the present invention.

It was necessary to distribute the entire software by the recording medium such as CD-ROM though it is the version-up of a part of software when the software of the embedded controller is changed. Therefore, there is the problem of taking time to distribute software.

When the embedded controller notice assignment is served, the control operation means server means which keeps and transmits said control operation means, and the control operation means sales means which sells the control operation means are connected in the network in the present invention to solve the above-mentioned problem.

Making to a high function and the enlargement of control software for the embedded controller are advanced in the background of making of the control system electronics, typically X-by-Wire and the hybrid system, and legal restrictions of the emission requirement and the OBD restriction, etc. for the vehicle control.

Moreover, there is a problem of designing and making the control software which makes to a high function and enlarges efficiently.

To solve the above-mentioned problem, said embedded controller is installed in the vehicle to control the engine and transmission gear, etc. in the present invention.

What is claimed is:

1. A control unit comprising:
a signal receiving section which captures an input signal from outside and converts captured said input signal into a form of data;
a processor which processes said input signal in said form of data to compute a control data;
a signal outputting section which outputs said control data to an external device to be connected thereto as a control signal therefor;
a memory which memorizes an embedded software to make said processor execute said computation of said control data; wherein
said embedded software includes an application software and a basic software; wherein
said application software includes a first software component and a second software component, and an interface layer that includes a first interface software corresponding to said first software component and a second interface software corresponding to said second software component, and a basic controlling software that controls an execution sequence of said first software component and said second software component; wherein
said first interface software independently controls input to and output from said first software component, and said second interface software independently controls input to and output from said second software component, and said basic software controls starting said application software, and reading-out said input signal and sending-out said control signal according to commands generated from said application software; wherein
said first software component performs computation based on said input signal or a control data that is a result of controlling computation performed by said second software component; wherein
said interface layer controls exchange of said control data between said first software component and said second software component through the first interface software and the second interface software; and wherein
said control data that is the result of the second software component controlling computation is input to the first software component through the first interface software and the second interface software of the interface layer.

2. The control unit according to claim 1, wherein said first interface software preserves said control data which is computed by said first software component supported by said first interface software; and
said second interface software refers to said control data preserved in said first interface software.

3. The control unit according to claim 2, wherein
said first interface software collects said control data referring to said control data preserved in said second interface software or referring to said control data preserved in said first interface software; and
said data to be collected is a data that said first software component, which is supported by said first interface software, uses in its execution of computation.

4. The control unit according to claim 3, wherein
said first interface software commands said first software component to execute computation over said control data collected by said first interface software for said computation by said first software component;
said first interface software provides said first software component with such a condition that said first software component can refer to said specified control data in its execution of commanded computation; and
said control data to be computed is specified by said first interface software from among said collected control data.

5. The control unit according to claim 4, wherein said first interface software preserves a control data that is a result of computation by said first software component; and
said second interface software preserves a control data that is a result of computation by said second software component;
wherein the number of said control data to be preserved is only one for each of said first software component and said second software component.

6. The control unit according to claim 3, wherein said first interface software preserves a control data that is a result of computation by said first software component; and
said second interface software preserves a control data that is a result of computation by said second software component;
wherein the number of said control data to be preserved is only one for each of said first software component and said second software component.

7. The control unit according to claim 2, wherein said first interface software preserves a control data that is a result of computation by said first software component; and
said second interface software preserves a control data that is a result of computation by said second software component;
wherein the number of said control data to be preserved is only one for each of said first software component and said second software component.

8. The control unit according to claim 1, wherein said first interface software preserves a control data that is a result of computation by said first software component; and
said second interface software preserves a control data that is a result of computation by said second software component;
wherein the number of said control data to be preserved is only one for each of said first software component and said second software component.

9. The control unit according to claim 1, wherein
said second software component computes a variable that is used by said application software.

10. The control unit according to claim 1, wherein said signal receiving section captures an input signal by a sensor or other control unit, and said external device is an actuator or other control unit.

* * * * *